United States Patent
Feuer et al.

[11] Patent Number: 5,857,048
[45] Date of Patent: Jan. 5, 1999

[54] FOURIER-PLANE PHOTONICS PACKAGE

[75] Inventors: Mark D. Feuer, Colts Neck; Joseph E. Ford, Oakhurst, both of N.J.

[73] Assignee: Lucent Technologies, Inc., Murray Hill, N.J.

[21] Appl. No.: 712,530

[22] Filed: Sep. 11, 1996

[51] Int. Cl.⁶ .................................................. G02B 6/36
[52] U.S. Cl. .................. 385/88; 385/89; 385/92; 385/93
[58] Field of Search ............... 385/88–94, 33–35, 385/49, 72, 59, 78

[56] References Cited

U.S. PATENT DOCUMENTS

| | | | |
|---|---|---|---|
| 4,264,127 | 4/1981 | Schumacher et al. | 385/85 |
| 4,718,055 | 1/1988 | Winzer | 385/24 |
| 4,834,485 | 5/1989 | Lee | 385/33 |
| 5,031,984 | 7/1991 | Eide et al. | 385/27 |
| 5,199,088 | 3/1993 | Magel | 385/18 |
| 5,473,716 | 12/1995 | Lebby et al. | 385/49 |

*Primary Examiner*—Hemang Sanghavi

[57] ABSTRACT

A photonics package, and methods for its use are disclosed. In one configuration, a collimating lens is disposed between a photonics device and a ferrule containing two optical fibers. Preferably, one of the fibers delivers an optical signal to the photonics device, and the other fiber receives an optical signal from the photonics device. The fibers within the dual-fiber ferrule are located off of the optical axis of the lens so that light emanating from the signal-delivering fiber will be imaged onto the photonics device at a slight angle from the normal and may be reflected at the same angle for coupling into the signal-receiving fiber. Preferably, the photonics device is situated at the Fourier plane to facilitate coupling reflected light into the signal-receiving fiber. The function of the photonics package varies with the included photonics device. For example, the package can function as a data receiver, a data transmitter and a data transceiver by incorporating, respectively, a photodetector, an optical modulator, and a transceiver. The photonics package, which can be integrated in optical communications networks, allows for incoming and outgoing signals to be handled on separate fibers, obviating the need for a splitter as required in one fiber systems. A decrease in signal loss throughout the optical communications system can thus be realized.

14 Claims, 6 Drawing Sheets

FOURIER-PLANE PHOTONICS PACKAGE

STATEMENT OF RELATED APPLICATIONS

The present application is related to "METHODS AND ARRANGEMENTS FOR DUPLEX FIBER HANDLING", filed Jul. 26, 1996 as Ser No. 08/688,178, inventors Mark D. Feuer and Joseph E. Ford; "WAFER LEVEL INTEGRATION OF AN OPTICAL MODULATOR AND Ill–V PHOTODETECTOR", filed Jul. 23, 1996 as Ser. No. 08/685,294, inventors John E. Cunningham, Joseph E. Ford, Keith Wayne Goossen and James A. Walker; and, "METHOD AND ARRANGEMENT FOR A COMBINED MODULATOR/PHOTODETECTOR", filed Jul. 5, 1996 as Ser. No. 08/675,980, inventors David J. Bishop, Keith Wayne Goossen and James A. Walker. Each of the aforementioned applications is assigned to the present assignee.

FIELD OF THE INVENTION

The present invention relates generally to packaging photonics devices.

BACKGROUND OF THE INVENTION

Network architectures for two-way optical fiber communications to the home have been proposed. Cost targets must be achieved for such architectures to be implemented. Wavelength-Division-Multiplexed (WDM) network architectures, for example, have been proposed that use optical modulators, rather than expensive wavelength-stabilized sources, at each home. The optical modulators are powered by a shared laser source at a central office.

Surface normal optical modulators operating in a reflection mode ("reflective modulators"), that is, modulators that operate by reflecting, or not reflecting, an incident optical signal, may be used in such networks. These modulators can be packaged by butt-coupling them to a single mode fiber. In such an arrangement, the reflected data signal is carried in the same fiber that supplied the incident optical signal. For processing, the reflected data signal is separated from the incident signal, such as by passing the signal carrying fiber through a 2×2 splitter. The splitter adds complexity to the system and can cause 6 dB of intrinsic loss; 3 dB on each pass.

Thus, there is a need for a package for a reflective modulator that, in conjunction with the network architecture, reduces power losses.

SUMMARY OF THE INVENTION

A photonics package, and methods for its use and fabrication, are disclosed. In one illustrative embodiment, a lens is disposed between a ferrule containing two optical fibers ("dual-fiber ferrule") and a photonics device. Preferably, one of the fibers ("the input fiber") delivers an optical signal to the photonics device, and the other fiber ("the output fiber") receives an optical signal from the photonics device. The lens is appropriately spaced from the dual-fiber ferrule for collimating light. The fibers within the dual-fiber ferrule are offset from the optical axis of the lens so that light emanating from the input fiber will be received by the modulator at a slight angle from the normal to the modulator. The angled incidence of the optical signal upon the photonics device results, in preferred embodiments, in the signal being reflected toward and imaged onto the output fiber. Preferably, the modulator is situated at the Fourier plane of the lens to facilitate coupling reflected light into the output fiber.

A photonics package according to the present invention has a variety of uses as a function of the specific photonics device included within the package. Without limitation, the package can function as a data receiver, a data transmitter and a data transceiver.

In addition, the package may be advantageously integrated in optical communications systems. For example, in an illustrative embodiment, the photonics package, which is incorporated into each one of a plurality of network units, receives information transmitted from a central office to each network unit and encodes information on an optical signal for transmission back to the central office.

Conventional photonics packages use a single fiber for delivering a first optical signal to a photonics device within the package, and for receiving a second optical signal from the photonics device for transmission out of the package. A photonics package according to the present invention, however, allows for receiving a first signal through a first fiber, and transmitting a second signal out of the package through a second fiber. As such, when using a photonics package according to the present invention, the signals do not have to be separated for processing. A splitter for separating the signals, which is typically required in single fiber systems, is therefore not required in optical communications systems using the present photonics package. This results in a decrease in signal loss throughout the communications system, and a decrease in system complexity and cost.

BRIEF DESCRIPTION OF THE DRAWINGS

Further features of the invention will become more apparent from the following detailed description of specific embodiments thereof when read in conjunction with the accompanying drawings, in which like elements have like reference numerals and in which.

DETAILED DESCRIPTION

Figure 1:
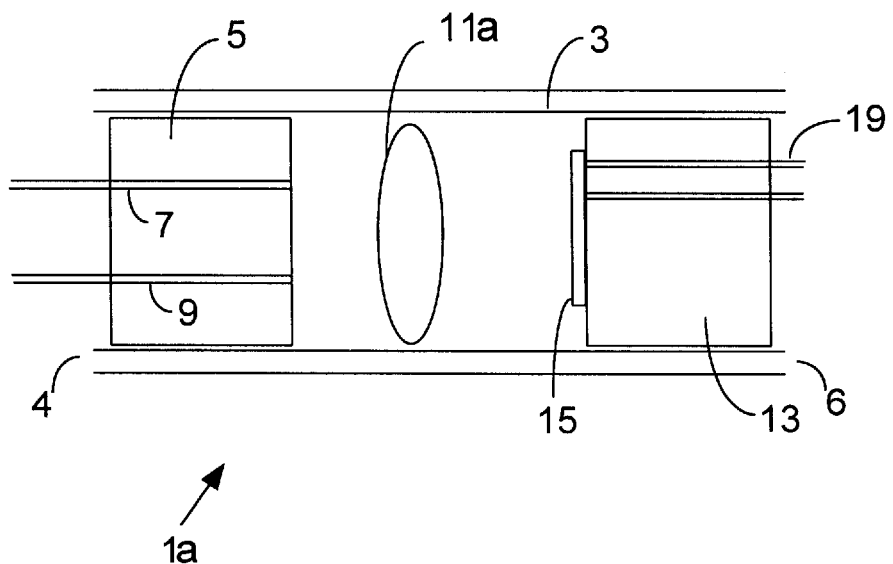
FIG. 1 is a first illustrative embodiment of a photonics package 1a according to the present invention.

FIG. 1 shows a first illustrative embodiment of a photonics package 1a according to the present invention. In the illustrative embodiment, the photonics package 1a includes a rigid, impact resistant sleeve 3 formed from a precisely shapeable material. In a preferred embodiment, the sleeve 3 is ceramic. The sleeve can have any convenient shape, e.g., cylindrical, rectangular, and so forth. In an alternate embodiment, the sleeve 3 can be configured similarly to sleeves used for rotary slices, which typically include a beryllium copper sleeve shaped as a triangular prism with three glass rods in the creases as guide pins. The sleeve 3 receives, at a first end 4, a first optical fiber 7 and a second optical fiber 9. As shown in detail in a later Figure, the optical fiber 7 can be used to deliver an optical signal 25 to the package 1a, and more specifically to a photonics device 15, while the fiber 9 can be used for receiving an optical signal 26 from the photonics device 15.

It will be appreciated that the optical fibers 7 and 9 must be retained in a specific location with respect to other optical components within the system, as described in more detail below. According to an illustrative embodiment of the present invention, such positioning is achieved by a dual-fiber ferrule 5.

Figure 2A:
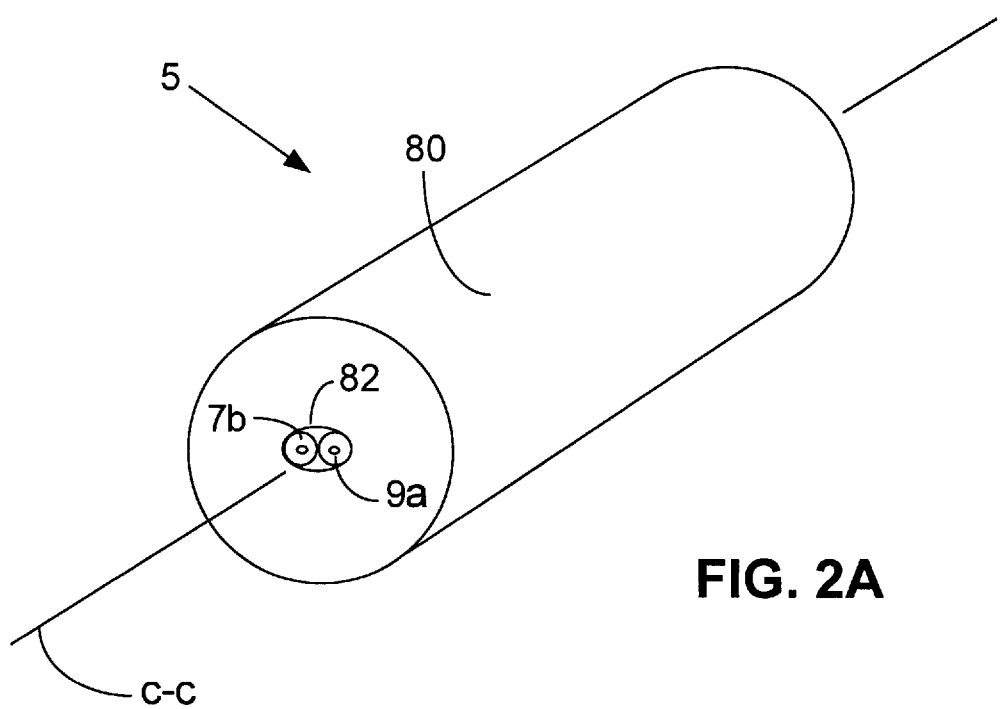
FIG. 2a shows an exemplary dual-fiber ferrule.

As shown in FIG. 2a, the dual-fiber ferrule 5 consists of a bore 82 located along the longitudinal symmetry axis C—C of a retaining member 80. The retaining member 80 is made from a rigid, stable material capable of being precisely formed into a desired shape. Preferably, the retaining member 80 is a ceramic. Optical fibers 7 and 9, with plastic coating layers removed, i.e., the fibers 7 and 9 as received comprise only a fiber core 7a, 9a and a cladding layer 7b, 9b, are received by the bore 82.

In the dual-fiber ferrule 5 shown in FIG. 2a, the bore 82 is shown to be ellipsoidal in cross section. Such a shape provides a single defined rotational orientation of the fiber cores. In the exemplary photonics package 1a, such definition is not required, so that the bore 82 can be round, as well. The size of the bore 82 is large enough to accept the two fibers in a tight fit.

Further embodiments and description of a dual-fiber ferrule suitable for use in conjunction with the present invention is described in "METHODS AND ARRANGEMENTS FOR DUPLEX FIBER HANDLING", filed Jul. 26, 1996 as Ser. No. 08/688,178, assigned to the present assignee. That patent application, and any other patents, patent applications or publications mentioned in this specification are incorporated by reference herein.

The sleeve 3 receives, at a second end 6, the photonics device 15, which is preferably disposed on a device mount 13. The device mount 13 can be an electrical header, for example, which provides electrical connection between the photonics device 15 and processing electronics, not shown, located outside the package 1a. Electrical connection is provided by electrical contacts 19. In the case of an electrical header, the contacts 19 are typically pins.

It will be appreciated that the optical signal 25 from the optical fiber 7 cannot be directed along a path normal to the photonics device 15. In such a case, the reflected signal 26 would be returned to the fiber 7. The optical signal 25 can, however, be directed to the photonics device 15 at an appropriate angle so that the reflected optical signal 26 is imaged into the fiber 9. Thus, disposed within the sleeve 3 between the optical fibers 7 and 9 and the photonics device 15 is an imaging device. In the illustrative photonics package 1a, the imaging device is a single lens 11a. The lens 11a is used for imaging the optical fiber 7 into the fiber 9. Suitable lenses 11a include, without limitation, gradient index (GRIN) lenses, ball lenses and molded lenses, such as, for example, injection molded lenses.

Figure 2B:
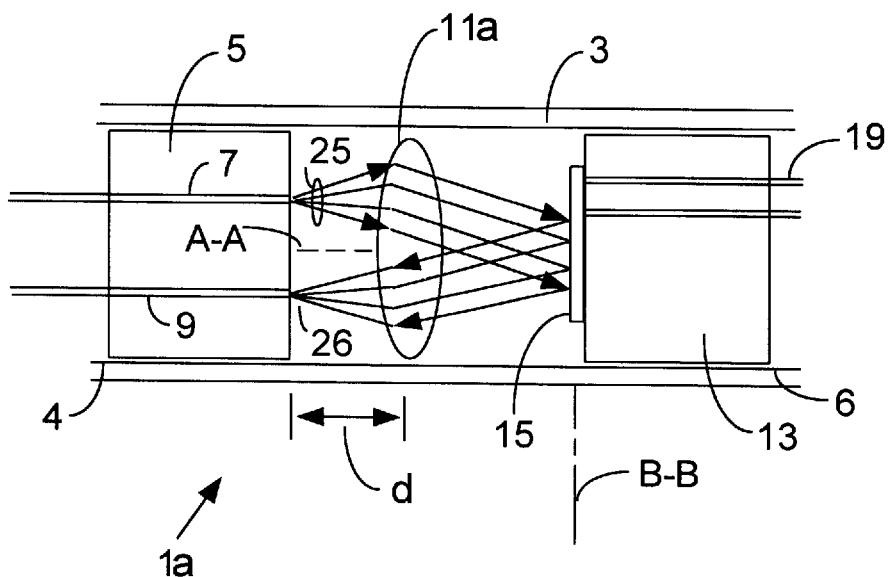
FIG. 2b illustrates the path of an optical signal through the photonics package of FIG. 1.

As shown in FIG. 2b, the lens 11a is positioned a distance, d, from the optical fibers 7 and 9, equal to the focal length of the lens 11a. When so positioned, the lens 11a will collimate the optical signal 25. The fibers cores 7a and 9a are equidistant from the optical axis A—A of the lens 11a. The photonics device 15 is located at the Fourier plane B—B. As will be appreciated by those skilled in the art, the Fourier plane is essentially the back focal plane of a lens. A collimated beam entering a lens would be focused to a point on a surface located at the Fourier plane. See Goodman, *Introduction to Physical Optics*, Chapter 5, "Fourier Transforming and Imaging Properties of Lenses," (McGraw-Hill, 1968) for a mathematical definition.

It is particularly advantageous to place a reflective photonics device 15 in the Fourier plane; doing so creates a telecentric optical system upon two passes through the lens. A telecentric system is defined as one in which the entrance pupil and/or the exit pupil is located at infinity. See Smith, *Modern Optical Engineering*, Chapter 6, Section 6, (McGraw-Hill, 1990). In the context of a fiber optic system, telecentricity means that the optical beam incident on the output fiber will match the optimum incidence angle, resulting in optimized coupling. Thus, the reflected optical signal 26 will be imaged, via the lens 11a, into the optical fiber 9 with high efficiency.

Preferably, the device for retaining the optical fibers 7 and 9, such as the dual-fiber ferrule 5, the photonics mount 13 and the sleeve 3 are formed so that they provide passive alignment for the optical fibers 7, 9 and the photonics device 15. That is, the aforementioned components are designed such that when the photonics package 1a is assembled, the optical signal 25 from the optical fiber 7 will be optically aligned with the optical fiber 9.

In other embodiments, a photonics package according to the present invention can be actively aligned, such as by tilting the modulator or moving the lens 11a and the photonics device 15 with respect to the optical fibers 7, 9. In such embodiments, the various components are held in fixtures so they can be moved as described above. Once the components are optically aligned, they can be retained in position by various optical packages known to those skilled in the art. It will be appreciated that the sleeve 3 of the photonics package 1a is not used in such embodiments.

There are relatively stringent tolerances on lens centration and fiber positioning. These tolerances are achievable due to the symmetry of the dual-fiber ferrule 5 and GRIN or ball lens fabrication. Grin lens polish angle tolerance, which is expected to be much less than 1 degree, may not be achievable using standard techniques, such as setting a batch of lenses in wax and group polishing the lenses. Achieving such tolerances may require using a polishing jig with holes drilled to accept a GRIN lens and for holding the lens perpendicular to the optic axis. Using a spherical ball lens guarantees lens centration and eliminates the concern with the polish angle of the GRIN lens. Device positioning and tilt tolerances are achievable using a conventional header mounting technique with a sufficiently large device die size. The gap tolerances between the dual-fiber ferrule 5 and the lens 11a, and the photonics device 15 and the lens 11a are on the order of several microns ($\mu$m) and are readily achievable.

Figure 3:
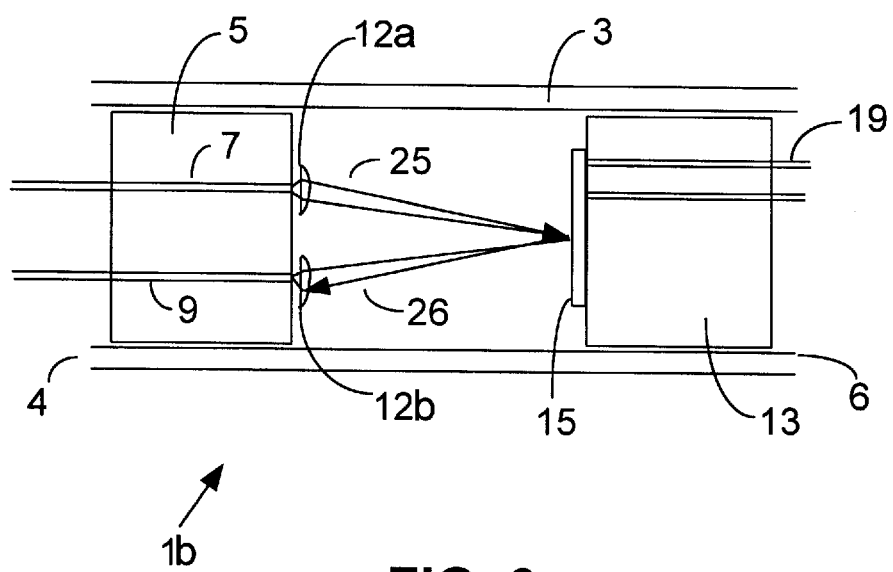
FIG. 3 is a second illustrative embodiment of a photonics package 1b according to the present invention.

A second illustrative embodiment of a photonics package 1b according to the present invention is shown in FIG. 3. In the package 1b, the imaging device consists of two microlenses 12a and 12b. The microlenses 12a and 12b are separated from the ends of the optical fibers 7 and 9 by a small gap. It is within the capabilities of those skilled in the art to fabricated the microlenses 12a and 12b. For example, the microlenses can be fabricated by depositing a refractive layer on a clear substrate and forming appropriately spaced spherical surfaces in the refractive layer using, for example, photolithographic techniques. See, for example, D. R. Purdy, "Fabrication of Complex Micro-Optic Components using Halftone Transmission Masks to Photosculpt Positive Resist," EOS Top. Mtg. Dig. S., Vol. 2, (1993). The substrate can then be diced and placed in close proximity to the fiber ends. Precise alignment of each microlens 12a and 12b to the fibers is required. In preferred embodiments, aspheric correction is used to reduce signal loss from microlens aberrations. Such corrections are within the capabilities of those skilled in the art, and may be accomplished by using a diffractive microlens. Chromatic aberrations, especially in diffractive microlenses, may restrict the usable wavelength bandwidth.

Photonics packages according to the present invention, such as the illustrative packages 1a and 1b, have a variety of applications, depending upon the particular photonics device 15 included within the package. In one embodiment, the present photonics package functions as a data transmitter. In preferred embodiments of the photonics package as a data transmitter, the photonics device 15 is an optical modulator 15a. Either semiconductor optical modulators, such as multiple quantum well modulators, or micromechanical modulators may suitably be used. An exemplary multiple quantum well modulator is described in Cunningham et al., "Reflectivity from Multiple Quantum Well Modulators with Contrast Ratio of 22:1 at 1.55 $\mu$m," Conference on Lasers and Electro-Optics 9, 1996, OSA Tech. Digest Series, p. 487. An exemplary embodiment of a micromechanical modulator 15a suitable for use in conjunction with the present invention is shown in FIGS. 4 and 5.

Figure 4:
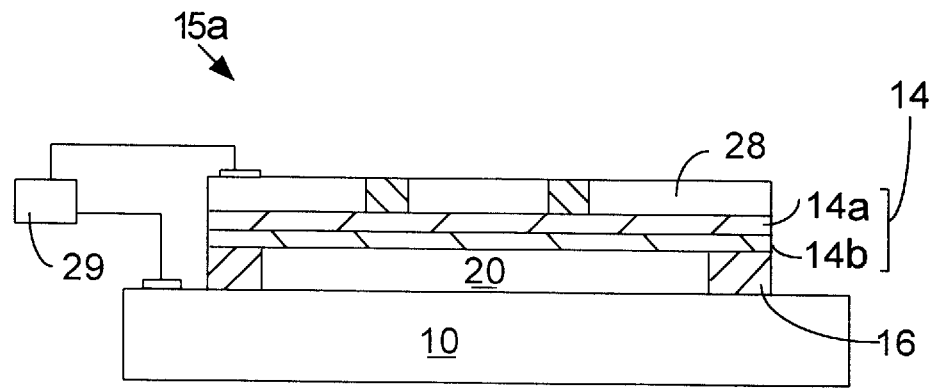
FIG. 4 is a cross-sectional side view of an exemplary embodiment of a micromechanical optical modulator suitable for use in conjunction with the present invention.
Figure 5:
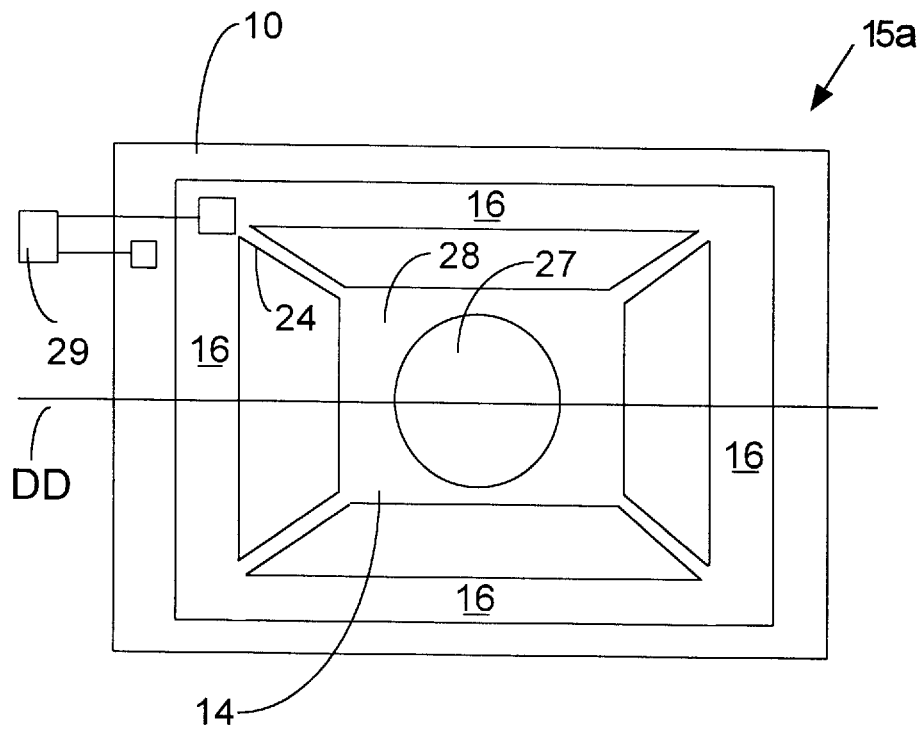
FIG. 5 is a top-view of the modulator of FIG. 4.

As shown in FIG. 4, which is a cross-sectional view through line DD in FIG. 5, the modulator 15a comprises a substrate 10 and a membrane 14 having one or more layers, such as the layers 14a and an optional layer 14b. The membrane 14 and the substrate 10 are spaced from each other defining a gap 20. As shown in FIG. 5, which is a plan view of the modulator 15a, the membrane 14 is suspended over the substrate 10 by support arms 24. The supports arms 24 are in turn supported by a nonconductive support layer 16. In other embodiments, discrete support arms 24 are not present. Rather, the membrane 14 itself overlaps the nonconductive support layer 16.

If the membrane 14 is not electrically conductive, a layer 28 of conductive material, such as, without limitation, gold or other conductive metals or alloys thereof, can be disposed on the membrane layer 14a. If the layer 28 is not transparent at the operating wavelength of the modulator 15a, then an optical window 27 must be defined with the layer 28.

The membrane 14 and the substrate 10, which are electrically isolated from one another, are electrically connected to a controlled voltage source 29. Applying a voltage across the membrane 14 and substrate 10 generates an electrostatic force that moves the membrane toward the substrate. As the membrane 14 moves, the size of the gap 20 changes, and so does the reflectivity of the modulator 15a. The change in reflectivity of the modulator 15a alters the measured amplitude of an optical signal reflected from the modulator. The changing reflectivity of the modulator 15a may thus be used to modulate an optical signal.

In the modulator 15a, a large change in reflectivity can be obtained if the following two conditions are met. First, the layer 14a has a thickness that is one-quarter of a wavelength, $\lambda$, of the optical signal being processed ("the operating wavelength"), as measured in the layer. And second, the layer 14a has a refractive index, $n_m$, that is about equal to the square root of the refractive index, $n_s$, of the substrate 10. Given those parameters, the modulator 15a will be highly reflective when the position of the membrane 14 is such that the gap 20 is an odd integer multiple of one-quarter of the operating wavelength, that is, $m\lambda/4$ where m is odd. Conversely, the modulator 15a will exhibit minimal reflectivity, i.e., be transmissive, when the gap 20 is zero or an even integer multiple of one-quarter of the operating wavelength, that is, $m\lambda/4$ where m is even or zero.

For maximum modulator contrast, the modulator 15a is fabricated, i.e., the gap 20 is sized, so that in the absence of an applied voltage, the modulator will exhibit its minimum or maximum reflectivity. As described above, this occurs when the gap 20 is an integer multiple of $\lambda/4$. When biased, the membrane 14 preferably moves a distance of $\lambda/4$, so that the gap 20 is still at some multiple of $\lambda/4$. As such, the modulator exhibits either maximum or minimum reflectivity in its biased mode, as well.

Thus, in embodiments in which the photonics device 15 is the modulator 15a, the modulator receives the optical signal 25 from the optical fiber 7 and returns a reflected optical signal 26, or not, to the optical fiber 9, depending upon the state of the modulator.

Further non-limiting descriptions of an optical modulator 15a suitable for use in conjunction with the present invention, including methods for making it and other embodiments thereof are provided in U.S. Pat. No. 5,500, 761, and co-pending U.S. patent applications Ser. No. 08/283,106 filed Jul. 29, 1994, Ser. No. 08/578,590 filed Jun. 7, 1995, Ser. No. 08/479,476 filed Jun. 7, 1995, Ser. No. 08/578,123 filed Dec. 26, 1995, Ser. No. 08/565,453 and Ser. No. 08/597,003.

In another embodiment, a photonics package according to the present invention can function as a receiver. In preferred embodiments of the photonics package as a receiver, the photonics device 15 is a photodetector 15b. Suitable photodetectors 15b for use in conjunction with the present invention include, without limitation, photoconductors, photodiodes, avalanche photodiodes, phototransistors, heterojunction photodiodes, P-I-N multiple quantum well detectors and metal-insulator III–V photodiodes. The operation and fabrication of such photodetectors are known to those skilled in the art.

In embodiments wherein the photonics package is functioning only as a receiver, the output fiber, i.e., the fiber 9, might not receive an optical signal.

Figure 6:
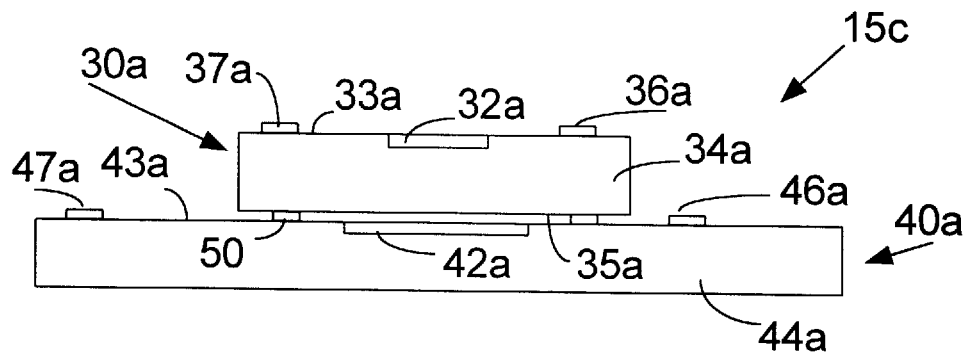
FIG. 6 is an exemplary embodiment of a combined optical modulator/photodetector for use in conjunction with the present invention.

In an additional embodiment, a photonics package according to the present invention can function as a data transceiver, including both a receiving and a transmitting element. In such an embodiment, the photonics device 15 is preferably a combined optical modulator/photodetector 15c or a wafer-level-integrated optical modulator/photodetector 15d. In such a photonics package, the optical fiber 7 delivers the optical signal 25 to the combined optical modulator/photodetector 15c or the wafer-level-integrated optical modulator/photodetector 15d, and such devices send a return signal, such as the optical signal 26, to the optical fiber 9. An exemplary combined optical modulator/photodetector 15c is illustrated in FIG. 6.

The exemplary combined optical modulator/photodetector 15c consists of a modulator chip 30a attached to a photodetector chip 40a. The modulator chip 30a includes a substrate 34a having a first surface 33a and a second surface 35a. Preferably, the substrate 34a is silicon, but, as will be appreciated by those skilled in the art, other semiconductors transparent at the operating wavelengths may suitably be used. An optical modulator 32a, is located along the first surface 33a of the substrate 34a. Contacts or wire bond pads 36a and 37a are in electrical contact with a controlled voltage source, not shown, and are also in electrical contact, respectively, with a feature of the modulator 32a and the substrate 34a. The optical modulator 32a can suitably be embodied as the modulator 15a described above.

The photodetector chip 40a includes a III–V substrate 44a having a first surface 43a. The III–V substrate 44a is preferably indium phosphide (InP) for optical communications applications, but may suitably be other III–V semiconductors, such as gallium arsenide (GaAs) in other embodiments. A photodetector 42a is located along the first surface 43a of the III–V substrate. The photodetector 42a can suitably be embodied as the photodetector 15b described above. The photodetector chip 40a can be electrically connected to equipment, not shown, for processing and receiving the electrical signal generated by the photodetector, through contacts or wire bond pads 46a and 47a.

In operation, the combined optical modulator/photodetector 15c receives a downstream information-carrying optical signal, such as the optical signal 25 from the fiber 7. During a first time period, the modulator 32a is placed in at least partially transmissive mode so that a first portion of the signal 25 is absorbed by the photodetector 42a. During a second time period, the optical modulator 32a encodes upstream information upon the signal 25 creating the optical signal 26 which is received by the fiber 9. Such information encoding is accomplished by a controlled variation of the reflectivity of the modulator 32a.

Further description of a combined optical modulator/photodetector 15c suitable for use in conjunction with the present invention, including methods for making it and other embodiments thereof, are provided in "METHOD AND ARRANGEMENT FOR A COMBINED MODULATOR PHOTODETECTOR," filed on Jul. 5, 1996 as Ser. No. 08/675,980.

Figure 7:
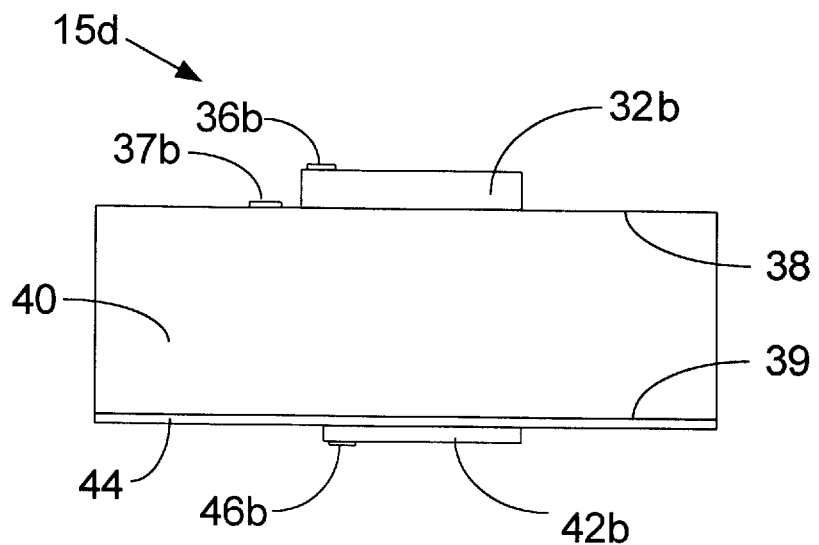
FIG. 7 is an exemplary embodiment of a wafer-level-integrated optical modulator/photodetector for use in conjunction with the present invention.

An exemplary wafer-level integrated (WLI) optical modulator/photodetector 15d is shown in FIG. 7. The WLI modulator/photodetector 15d includes a modulation region 32b and a photodetection region 42b that are formed on opposed surfaces 38 and 39, respectively, of an off-axis silicon substrate or wafer 40. The modulation region 32b can suitably be embodied as the modulator 15a described above. A first and second wire from a controlled voltage source, not shown, are bonded to bond pads or contacts 36b and 37b to place the controlled voltage source in electrical connection with the modulator region.

In a preferred embodiment, the photodetection region 42b is disposed on a buffer layer 44 situated on the surface 39 of the wafer 40, rather than directly on the surface 39. The buffer layer 44 provides a lattice-mismatch relaxation region between the first III–V layer, typically InP in communications applications, and the off axis substrate 40. The detection region 42b can suitably be embodied as the photodetector 15b mentioned above. A surface contact 46b on the photodetection region 42b provides electrical contact to the top layer of the photodetection region, which, is typically either a n- or a p-doped layer. The other contact can be provided by the substrate 40.

The WLI optical modulator/photodetector 15d operates in substantially the same manner as the combined optical modulator/photodetector 15c.

Further description of a WLI optical modulator/photodetector 15d suitable for use in conjunction with the present invention, including methods for making it and other embodiments thereof, are provided in "WAFER-LEVEL-INTEGRATION OF AN OPTICAL MODULATOR AND III–V PHOTODETECTOR," filed on Jul. 23, 1996 as Ser. No. 08/685,294.

In a further embodiment of a photonics package according to the present invention, the photonics package also includes a filter 17 for wavelength selection or wavelength drop. When placed between the lens 11a and the photonics device 15 of the photonics package 1a, the filter 17 will allow only light of a predetermined wavelength to reach the photonics device. As is known to those skilled in the art, such as a filter can be embodied as a planar reflective surface or dielectric mirror comprising a plurality of dielectric layers selected to reflect spectral components having other than a predetermined wavelength.

Figure 8A:
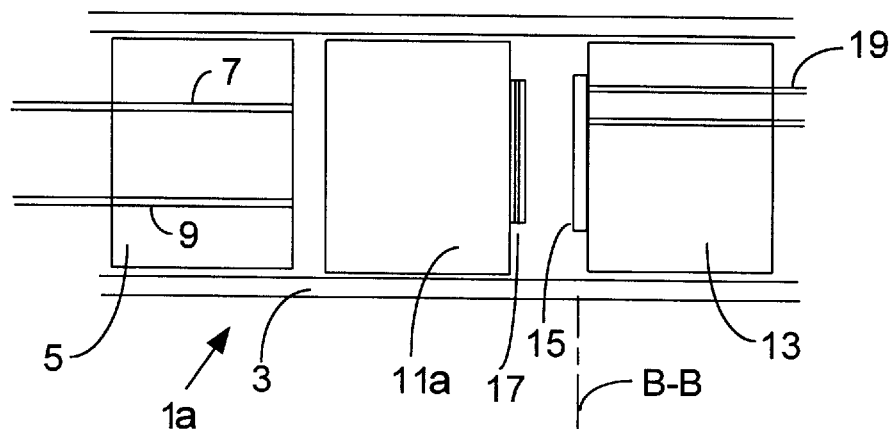
FIGS. 8a–8c show three exemplary embodiments of using a filter for wavelength selection in conjunction with the present invention.
Figure 8B:
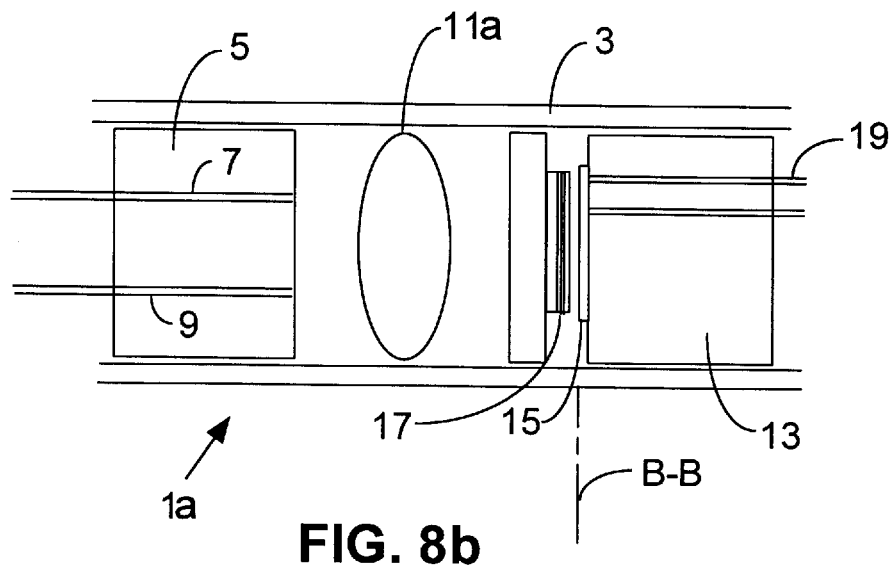

The filter 17 can be located in several positions within a photonics package according to the present invention. In one embodiment, the filter 17 can be disposed on the imaging device 11 provided that the surface on which the filter 17 is disposed is flat. As such, the filter 17 can be suitably disposed on a GRIN lens. The filter is preferably located on the end of GRIN lens closest to the photonics device 15, as shown in FIG. 8a. In a second, presently preferred embodiment, the filter 17 is located near the Fourier plane B—B, which can be accomplished by disposing the filter on a thin transparent media positioned near the Fourier plane, as shown in FIG. 8b.

Figure 8C:
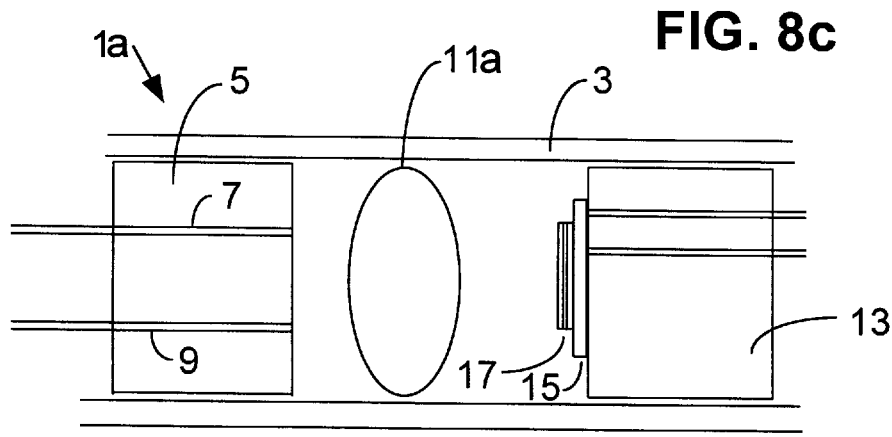

In an additional embodiment, illustrated in FIG. 8c, the filter 17 can be located on the photonics device 15. It will be appreciated that if the photonics device 15 is a micromechanical device, such as the optical modulator 15a, it is preferable not to locate the filter 17 on the photonics device 15. Among other reasons, the additional mass of the filter 17 would decrease modulator operating speed.

It is preferable to use the filter 17 in conjunction with the photonics package 1a, rather than the package 1b having dual microlenses 12a, 12b. If used in conjunction with the package 1b, the filter 17 should be disposed as close as possible to the image plane, i.e., the photonics device 15. If the photonics device 15 is a semiconductor device, the filter should be disposed on it.

In an additional embodiment, the photonics device 15 can be a modulator for modulating the optical phase or polarization of the optical signal, with or without modulating its amplitude. As is known in the art, phase modulation can be used to encode information onto the optical signal or to suppress undesirable effects such as stimulated Brillouin scattering that may occur in transmission media such as optical fiber. Since phase modulation can be achieved by varying optical path length, the previously-described micromechanical modulator 15a can function as a reflective phase modulator, such as by coating the moving membrane with a metal or another reflective material.

Figure 9:
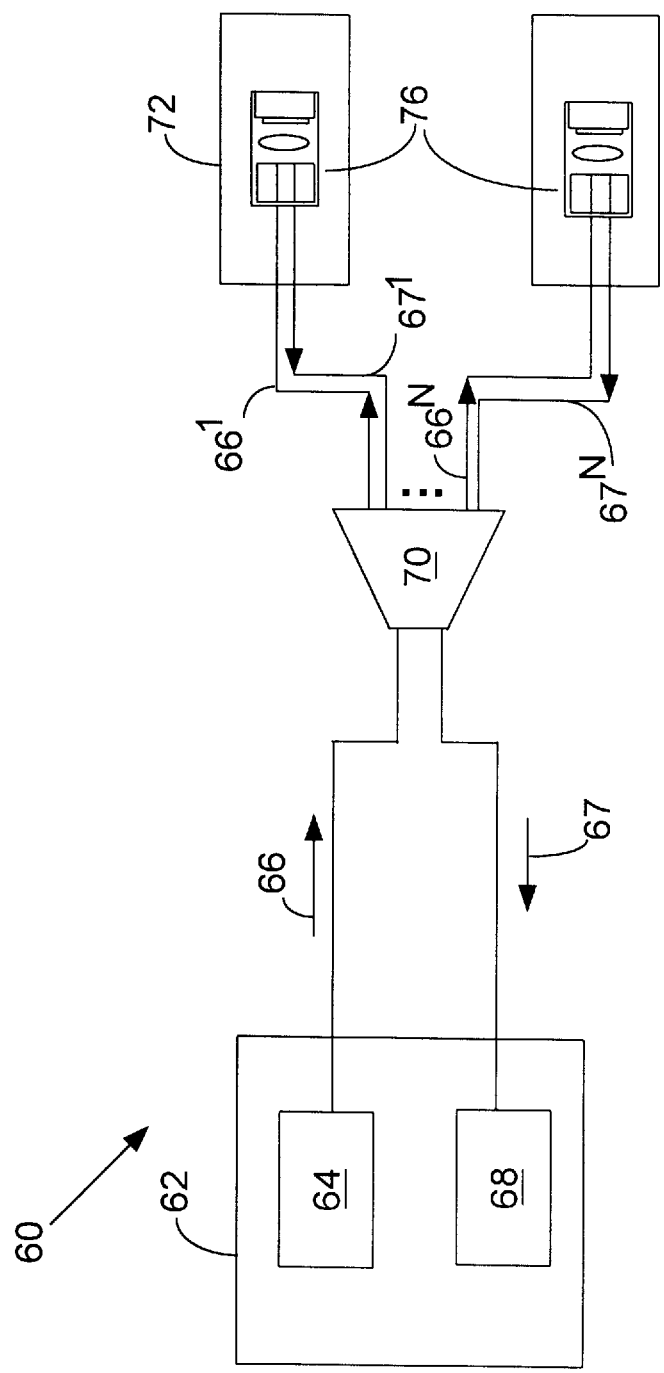
FIG. 9 illustrates an embodiment of an optical communications system using a photonics package according to the present invention.

Photonics packages according to the present invention can be advantageously used in optical communications systems, such as the passive optical network (PON) 60 shown in FIG. 9. See U.S. patent application Ser. No. 08/333,926, by T. E. Darcie, N. J. Frigo and P. D. Magill, assigned to the present assignee.

The exemplary PON 60 includes a central office or head end terminal 62 that has an active optical source 64, such as a multi-frequency laser or light emitting diode (LED). The central office 62 sends information via an optical signal 66, in wavelength-division-multiplexed (WDM) format, to a plurality of optical network units (ONU) 72. Each ONU 72 receives such information on a prescribed wavelength $\lambda_n$. A wavelength routing device 70 demultiplexes or resolves the optical signal 66 into its spectral components $66^{1-N}$, and routes each of such spectral components to the appropriate ONU 72, wherein the spectral component having a wavelength matching the prescribed wavelength of the ONU is routed to that ONU.

Each ONU 72 includes a photonics package 76, such as the illustrative packages 1a or 1b described above. In a preferred embodiment, the package 1a or 1b includes the combined optical modulator/photodetector 15c or WLI optical modulator/photodetector 15d.

Thus, the appropriate spectral component $66^i$ of the optical signal 66 is received by the photonics package 76 in an ONU 72. Typically, information is sent in "packets" via the optical signal 66. Each packet contains a portion of downstream information for processing, as well as a portion of continuous-wave (CW) light or "optical chalkboard" upon which upstream information can be encoded.

As described above, the modulator portion of the device 15c or 15d is placed in at least partially transmissive mode so that a portion of the energy of the spectral component $66^i$ is received by the photodetector portion of the device 15c or 15d. Thus, the optical energy reaching the photodetector portion is converted to an electrical signal, representative of the downstream information, and routed to processing electronics. During a second time period, the optical modulator portion encodes upstream information on the optical chalkboard portion of the packet, and returns upstream-information-carrying spectral component $67^i$, which is received by the fiber 9.

The plurality of upstream-information-carrying spectral components $47^{1-N}$ returned from the ONUs 72 are multiplexed by the wavelength routing device 64 into a signal 47, which is routed to a receiver 68 in the central office 62.

Although a number of specific embodiments of this invention have been shown and described herein, it is to be understood that such embodiments are merely illustrative of the many possible specific arrangements that can be devised in application of the principles of this invention. Numerous and varied other arrangements can be devised in accordance with these principles by those of ordinary skill in the art without departing from the scope and the spirit of the invention.

We claim:

1. A passively alignable photonic package comprising:

a dual fiber ferrule comprising a retaining member having a longitudinal bore therethrough disposed along a longitudinal symmetry axis thereof, the bore receives a first and a second optical fiber in tight fitting contact therein, each optical fiber having an optical core and a cladding layer, the bore having a shape that symmetrically offsets the optical cores from the longitudinal symmetry axis;

a photonics component comprising a photonics device disposed on a device mount;

an imaging device disposed between the dual fiber ferrule and the photonics component, wherein the imaging device places the first and second optical fibers and the photonics device in optical communication; and a sleeve for receiving the dual fiber ferrule, the imaging device and the photonics component, the sleeve having a size suitable for passively aligning the optical fibers and the photonics component.

2. The photonics package of claim 1 wherein, said first and second optical fibers are single-mode fibers.

3. The photonics package of claim 2, wherein the first optical fiber delivers a first optical signal.

4. The photonics package of claim 3, wherein the photonics device is operable to receive the first optical signal delivered by the first optical fiber and to deliver a second optical signal to the second optical fiber.

5. The photonics package of claim 4, wherein the second optical signal is a modulated version of the first optical signal.

6. The photonics package of claim 3 wherein the imaging device is positioned so that it collimates the first optical signal.

7. The photonics package of claim 1, wherein the retaining member and the sleeve comprise ceramic.

8. The photonics package of claim 1 wherein the imaging device is selected from the group consisting of a graded index lens, a ball lens and a molded lens.

9. The photonics package of claim 1 wherein the photonics device is located in a Fourier plane relative to the imaging device and the first and the second optical fiber.

10. The photonics package of claim 1 further comprising a wavelength filter.

11. The photonics package of claim 1 wherein the photonics device is selected from the group consisting of a transmitter, receiver and a transceiver.

12. The photonics package of claim 11, wherein the transmitter comprises an optical modulator.

13. The photonics package of claim 11, wherein the receiver comprises a photodetector.

14. The photonics package of claim 11, wherein the the transceiver comprises an optical modulator and a photodetector in optical communication.

* * * * *